2,753,142

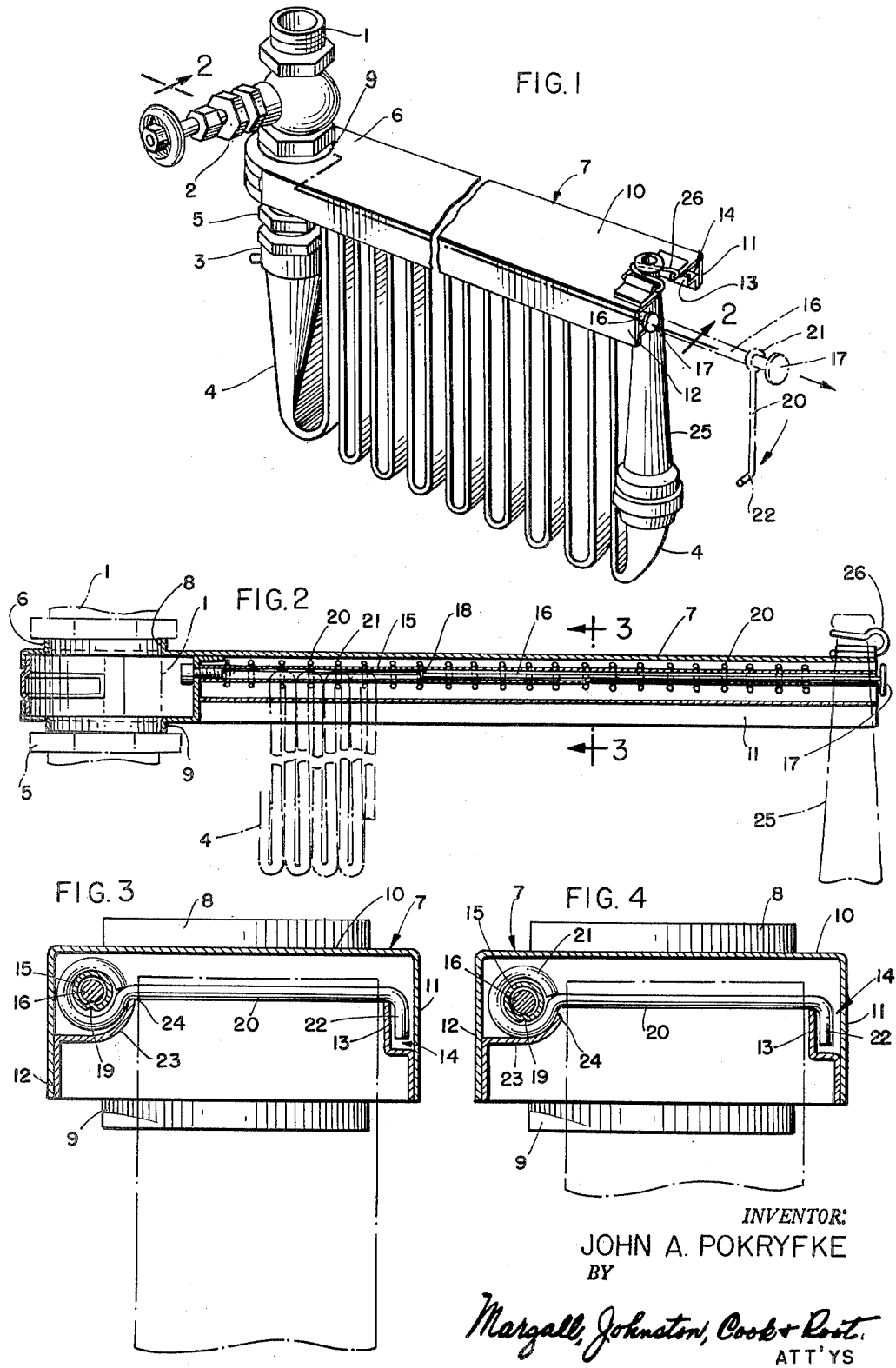

HOSE RACK

John A. Pokryfke, Chicago, Ill., assignor to W. D. Allen Manufacturing Co., Chicago, Ill., a corporation of Illinois Application June 25, 1954, Serial No. 439,267

1 Claim. (Cl. 248—92)

This invention relates to a hose rack for suspending a fire hose in a series of folds or loops so that the hose may be withdrawn quickly and easily from the rack. The hose loops are successively released from pivotally and slidably mounted pins, all as shown in Patent 1,505,330, assigned to the present assignee.

The aforesaid Patent 1,505,330 discloses a tube upon which the pins for receiving the loops of the hose are mounted, the pins being projected on a rod which telescopes with the tube after the hose is withdrawn from the rack. The present invention embodies substantially the identical structure disclosed in said Patent 1,505,330, except that it provides a support for supporting the pins independently of the tube, even though the eyes of the pins receive the tube. It is somewhat of a disadvantage to carry the weight of the hose on a tube which is merely suspended at one end, because the weight of the hose tends to deflect the tube.

The primary object of the present invention, therefore, consists in the provision of a device embodying the identical structure disclosed in the aforesaid patent, but includes new and improved means for preventing the sagging or downward shifting of the tube by providing a pin support independently of the tube, whereby the support, in the form of a ledge on a channel member, supports the pins, and consequently the hose, either by the pins engaging their lower sides beneath the eyes, or at a short distance from the eyes but in close proximity thereto.

The accompanying drawing illustrates a selected embodiment of the invention, and the views therein are as follows:

Fig. 1 is a detail perspective view of a fire hose suspended or supported by the improved rack of the invention;

Fig. 2 is a detail longitudinal sectional view on the line 2—2 of Fig. 1;

Fig. 3 is a detail transverse sectional view on the line 3—3 of Fig. 2, said view showing the pins being supported on their undersides adjacent the pin eyes; and Fig. 4 is a view similar to Fig. 3 but showing the pins supported at the underside of the pin eyes.

The particular construction herein shown for the purpose of describing the invention discloses a water supply standpipe 1, which is provided with a supply valve 2. The pipe 1 has a coupling 3 to which a fire hose 4 may be attached. A threaded nut 5 on the pipe 1 supports the head or cylindrical body part 6 of a hose rack body 7. The cylindrical body part 6 of the rack encircles the standpipe 1 and is revolvably mounted thereon to permit the rack to be swung from one side to the other, depending upon in which direction the hose is to be drawn. The cylindrical body part 6 of the rack 7 is provided with upper and lower opposed openings to receive the standpipe 1. Upper and lower integral upstanding collars 8 and 9 are extruded, or otherwise formed, from the upper and lower parts of the rack to provide a support for the rack and to prevent fouling of the rack with the connections to the standpipe. The rack 7 is preferably made of sheet metal and is relatively channel shaped in cross section, having a top 10 and downwardly extending flanges or legs 11 and 12, Figs. 3 and 4.

The downturned flange 11 has fastened on the inside thereof a longitudinal supporting guide bar, with a strip or element 13 in the form of a Z-bar providing a guideway 14 between the flange 11 and the bar 13.

A tubular rod or tube 15 is connected to the inner end of the rack 7, and extends longitudinally along one side substantially the full length of the rack. A rod 16 is mounted within the tube 15 and provides an extension which telescopes out from the tube. The telescoping rod 16 is provided at its outer end with a head 17, the inner end of the rod 16 being provided with a suitable enlargement 18 engaging an abutment or stop 19 on the inside of the tube 15 so as to prevent the rod 16 from being removed fully from the tube.

A plurality of hose carrying cross pins 20 are adapted to be received within the loops of the hose 4 to maintain the hose in its looped position. The pins 20 are each provided with an eye 21 at one end which loosely encircle the tube 15. The other or outer free end of each pin 20 is provided with a downwardly turned finger 22 which enters the groove or passageway 14 between the flange 11 and the Z-bar 13. Each pin is adapted to be supported on the free end of the Z-bar 13, and is supported thereon, as clearly shown in Figs. 3 and 4. The bent fingers 22 of the pins 20 retain them in general transverse position upon the rack and prevent accidental removal thereof.

A longitudinal bar 23, in the form of a strip, is secured to the inside of the flange 12, adjacent to, but below, the tube 15. The bar or strip 23 provides a supporting ledge 24, Fig. 3, which is adapted to engage each pin 20 inwardly of the pin eye 21. The supporting ledge is offset from the inside surface of the depending rack flange 12 to provide a guideway into which the eyes of the pins are arranged. If desired, the ledge 24 may be relatively shortened, as shown in Fig. 4, so that it will support the underside of each eye. In either instance, the weight of the hose 4, while the hose is looped about the pins, will be supported directly on the longitudinal members 13 and 23.

The outer free end of the top 10 of the rack 7 is cut out to receive the hose nozzle 25 of the hose 4, a spring clip 26 being provided at the cut-way to frictionally engage the nozzle but allowing it to be pulled out quickly and easily for use.

The hose 4 is supported by the pins 20, engaging the underside of the upper hose loops, allowing the hose to be withdrawn from the rack by merely pulling the nozzle outwardly. As the hose is pulled out, the outermost pin 20 will engage the head 17 of the rod 16, and the pin to be shifted onto the rod 16 will telescope the rod 16 to the position shown in dotted lines, Fig. 1. As soon as the hose 4 is pulled from the rack 7, the first pin 20 will become disengaged from the supporting members 13 and 24 and become engaged with the head, pulling out the rod 16 and then dropping downwardly and releasing a loop of the hose. Continued outward pulling of the hose will bring each succeeding pin 20 from its supporting position on the opposed side guides onto the telescoped rod 16 as the pins become disengaged successively from the guides 13 and 23.

The invention, therefore, maintains all the advantages of the device disclosed in the aforesaid Patent 1,505,330, but in addition renders greater strength and stability in that the weight of the hose is carried by the side flanges because of the pins bearing directly on the side flanges instead of having the eye end of each pin supported solely by the tube.

Changes may be made in the form, construction and arrangement of the parts without departing from the spirit of the invention or sacrificing any of its advantages, and the right is hereby reserved to make all such changes as fall fairly within the scope of the following claim.

The invention is claimed as follows:

A hose rack comprising a body having vertically spaced integral collars adapted to be mounted for revolvability about a water pipe, an elongated top cover extending horizontally from said body and having downturned side flanges, a side support secured to each flange and having an upwardly directed edge spaced inwardly from its flange and below the top cover, a series of hose supporting pins extending transversely of said cover and supported by and between said side supports, a hose supported in loops by said series of pins, a downturned finger on one end of each pin to slidably engage the outer face of the corresponding side support, a telescoping member including a tube and a rod in said tube, said tube having one end secured in and supported by said body above the other of said side supports and between its upwardly directed edge and the adjacent flange, an eye on the opposite end of each of said pins slidably mounted on said tube, and a knob on the outer end of the rod larger than the size of each eye whereby the pin eyes are receivable on the rod upon withdrawal of the hose causing the pin eyes to engage the knob and extend the rod from the tube and withdraw the free ends of the pins from their side support.

References Cited in the file of this patent

UNITED STATES PATENTS

| | | |
|---|---|---|
| 903,538 | Bowes | Nov. 10, 1908 |
| 1,230,678 | Cowan | June 19, 1917 |
| 1,505,330 | Gibbs | Aug. 19, 1924 |